No. 803,501. PATENTED OCT. 31, 1905.
W. J. & J. R. MITCHELL.
VEHICLE WHEEL.
APPLICATION FILED JAN. 11, 1905.
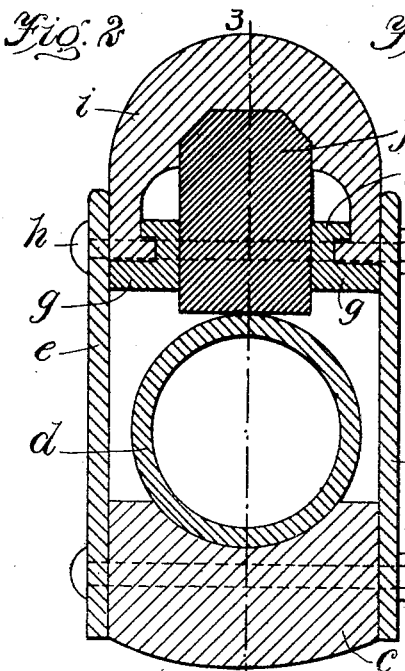
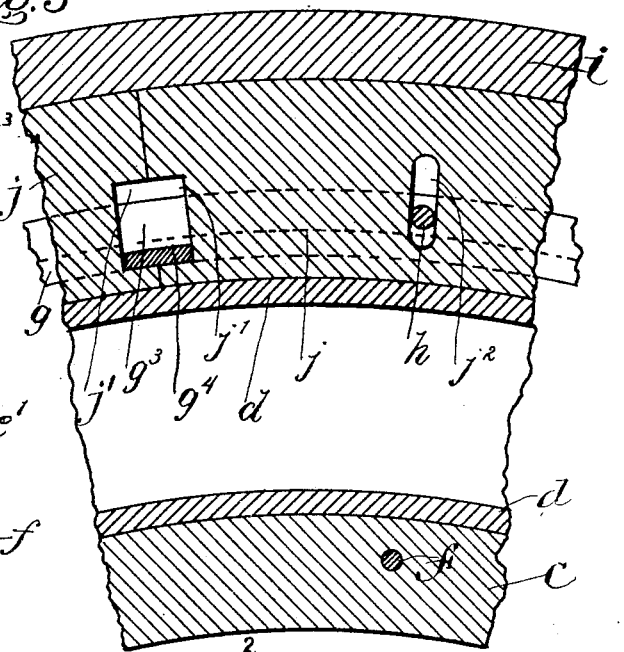
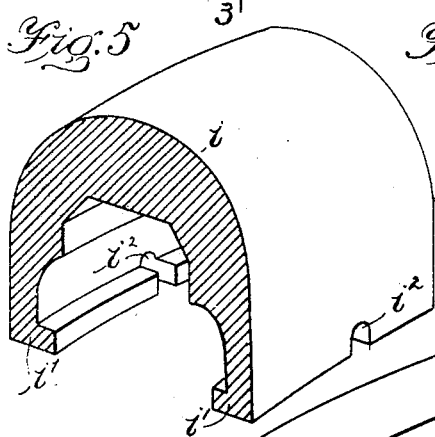
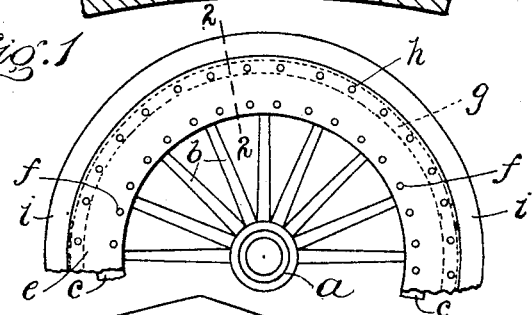
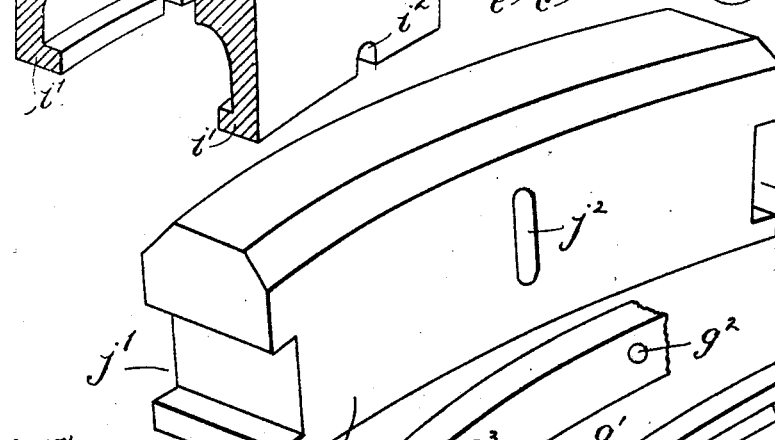
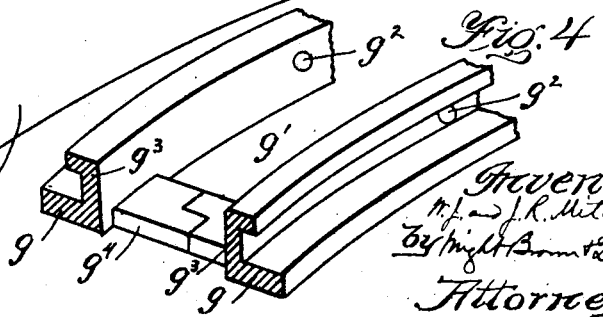
Witnesses:
Inventors:
W. J. and J. R. Mitchell
Attorneys

UNITED STATES PATENT OFFICE.

WINFIELD J. MITCHELL AND JAMES R. MITCHELL, OF LYNN, MASSACHUSETTS.

VEHICLE-WHEEL.

No. 803,501.　　　　Specification of Letters Patent.　　　　Patented Oct. 31, 1905.

Application filed January 11, 1905. Serial No. 240,526.

*To all whom it may concern:*

Be it known that we, WINFIELD J. MITCHELL and JAMES R. MITCHELL, of Lynn, in the county of Essex and State of Massachusetts, have invented certain new and useful Improvements in Vehicle-Wheels, of which the following is a specification.

This invention relates to wheels for automobiles and other vehicles having tread-surfaces which are supported by an inflated tube or pneumatic cushion.

The invention has for its object to provide a wheel of this character in which the air-tube shall be protected in such manner as to prevent the puncturing of the tube by nails, pieces of glass, and other objects which may be encountered by the tires of vehicle-wheels.

To this end the invention consists in the improvements which we will now proceed to describe and claim.

Of the accompanying drawings, forming a part of this specification, Figure 1 represents a side view of a portion of a vehicle-wheel embodying our invention. Fig. 2 represents a section on line 2 2 of Fig. 1. Fig. 3 represents a section on line 3 3 of Fig. 2. Fig. 4 represents a perspective view showing portions of the two annular seats hereinafter referred to. Fig. 5 represents a perspective sectional view of a portion of the elastic tire. Fig. 6 represents a perspective view of one of the sections of the leg which is interposed between the elastic tire and the pneumatic cushion.

The same reference characters indicate the same parts in all the figures.

In the drawings, $a$ represents the hub, $b$ the spokes, and $c$ the rim or felly of a vehicle-wheel, said parts being rigidly connected in the usual or any suitable way and constituting a rigid wheel-body. $d$ represents an air-tube adapted to be inflated to form a pneumatic cushion and bearing on the rim or felly $c$. The rim is of chambered construction—that is to say, it is provided with outwardly-projecting side members $e\ e'$, which coöperate with the rim $c$ in forming a trough or chamber containing the cushion $d$. The members $e\ e'$ are preferably annular plates secured by bolts $f$ to the rim $c$.

$g\ g$ represent two annular outer seats which are concentric with the rim $c$ and are supported by the side members $e\ e'$, said seats $g$ being separated from each other by a peripheral opening $g'$, as shown in Fig. 4. The seats $g\ g$ are preferably metal rings, which may be cast from malleable iron or other suitable material and are preferably detachably secured to the side members $e\ e'$ by bolts $h$ passing through the side members and through orifices $g^2$ in hooked flanges or lips $g^3$, formed on the inner edges of the seats $g$. Cross-bars $g^4$ are preferably provided between the seats $g\ g$, said cross-bars spanning the opening $g'$ and serving to hold the seats $g$ properly spaced apart and also to engage the leg-sections hereinafter described. We prefer to cast the two seats $g\ g$ separately and to make each cross-bar $g^4$ in two sections, one of which is cast upon each of the seats $g$, the said sections abutting together between the seats, as shown in Fig. 4.

$i$ represents an elastic tire, which is approximately U-shaped in cross-section and has base portions $i'\ i'$ formed to bear upon the seats $g\ g$, as shown in Fig. 2, the said base portions being preferably provided with lips, which engage the hooked flanges $g^3$ and are held in such engagement by the outer portions of the rim members $e\ e'$. The base members of the tire are preferably provided with notches $i^2$, Fig. 5, formed to receive the bolts $h$, the tire being thus engaged with said bolts and prevented from creeping on the seats $g$.

Between the tread portion of the tire $i$ and the pneumatic cushion $d$ is interposed a leg, which is movable in the opening between the seats $g\ g$ and transmits to the pneumatic cushion the displacing pressure imparted to the tread portion of the tire. The said leg is preferably composed of a series of sections $j$, of elastic material, such as rubber or a composition containing rubber or of any other suitable elastic material. The sections $j$ and the corresponding inner surface of the tire are formed so that the sections are seated detachably in the tire. The ends of the sections $j$ are provided with recesses $j''$, which engage the cross-bars $g^4$, as shown in Fig. 3. The sections $j$ are also provided with slots $j^2$, through which the bolts $h$ pass. The said recesses and slots are sufficiently elongated to permit the necessary movements of the leg-sections. The cross-bars $g^4$ and bolts $h$, engaged, as shown, with the leg-sections, prevent the creeping of said sections upon the rim.

As shown in Fig. 2, the tire $i$ is formed with an annular cavity on each side of the leg $j$. This structure gives the base portions of the tire a considerable amount of flexibility, so that the tire may readily yield inwardly to radial pressure, so as to transmit the movement to the air-tube $d$ without resulting in any material rubbing or sliding movement between the sides of the leg and the side or base portions of the tire. It is desirable, of course, that the movements of the tire shall be restricted by the air-tube rather than by the leg, so as to obtain the effect of the air-pressure in the tube $d$ without interference due to the movements or elasticity of the leg $j$. The cavities described aid not only in permitting freedom of radial movement of the tire, excepting opposition afforded by the air-tube $d$, but also result in the sides of the base portions of the tire being sufficiently flexible so that they may bend freely without risk of being injuriously cut or chafed by the outer edges of the flanges $e$ $e$.

It will be seen that the air-tube or pneumatic cushion $d$ is effectually protected by the chambered rim, the tire-seats, the tire, and the interposed leg, so that there is no liability of the said cushion being punctured. The detachability of the leg from the tire enables the tire to be readily replaced without the necessity of replacing the leg, thus effecting a considerable saving of material. The sectional construction of the leg enables it to be more conveniently applied and removed than would be the case if the leg were made in one piece. Inasmuch, however, as we believe ourselves to be the first to interpose a detachable elastic leg between an elastic tire and a pneumatic cushion contained in a chambered wheel-rim we do not limit ourselves to the sectional construction of the leg.

In another application for Letters Patent of the United States for improvement in vehicle-wheels filed by us October 3, 1904, Serial No. 226,900, we have shown and claimed a structure upon which the subject-matter of this application is an improvement.

We claim—

1. A vehicle-wheel comprising a chambered rim provided with an inner seat and two outer spaced-apart seats, a pneumatic cushion bearing on said inner seat, an elastic tire having base portions bearing on said outer seats, a leg formed of a plurality of elongated segmental members of elastic material seated in said tire and bearing upon said cushion, said members being interposed between said outer seats and having their abutting ends provided with coinciding recesses, and securing devices engaging the recessed portions of said members, whereby the latter are prevented from creeping.

2. A vehicle-wheel comprising a chambered rim provided with an inner seat and two outer seats, a pneumatic cushion bearing on said inner seat, an elastic tire having base portions bearing on said outer seats, a leg formed of a plurality of elongated segmental members of elastic material seated in said tire and bearing upon said cushion, said members being interposed between said outer seats and having their abutting ends provided with coinciding recesses, and interlocking spacing-bars carried by said outer seats and engaging the recessed portions of said members.

3. A vehicle-wheel comprising a chambered rim provided with an inner seat and two outer seats, a pneumatic cushion bearing on said inner seat, an elastic tire having base portions bearing on said outer seats, an elastic leg seated in said tire and bearing on said cushion, said leg being provided with recesses, and interlocking space-bars formed integral with said outer seats and engaging said recesses.

4. A vehicle-wheel comprising a chambered rim provided with an inner seat and two outer seats, said outer seats being provided with oppositely-disposed integral space-bars provided with interlocking ends, a pneumatic cushion bearing on said inner seat, an elastic tire having base portions bearing on said outer seats, and a leg formed of a plurality of members seated in said tire and bearing on said cushion, said members being in engagement with said interlocking space-bars.

5. A vehicle-wheel comprising a chambered rim provided with an inner seat and two outer seats, said outer seats being provided with oppositely-disposed integral space-bars provided with interlocking ends, a pneumatic cushion bearing on said outer seats, and a leg formed of a plurality of elongated segmental members of elastic material seated in said tire and bearing upon said cushion, said members having their abutting ends provided with coinciding recesses adapted to receive said interlocking space-bars.

In testimony whereof we have affixed our signatures in presence of two witnesses.

WINFIELD J. MITCHELL.
JAMES R. MITCHELL.

Witnesses:
HORACE W. SAWYER,
HARRY E. MAYNARD.